No. 840,536. PATENTED JAN. 8, 1907.
W. D. WEIR.
FLEXIBLE ARMOR FOR HOSE AND PIPING.
APPLICATION FILED AUG. 21, 1905.

4 SHEETS—SHEET 1.

Witnesses

Welby D. Weir, Inventor
by C. A. Snow & Co.
Attorneys

No. 840,536. PATENTED JAN. 8, 1907.
W. D. WEIR.
FLEXIBLE ARMOR FOR HOSE AND PIPING.
APPLICATION FILED AUG. 21, 1905.
4 SHEETS—SHEET 2.
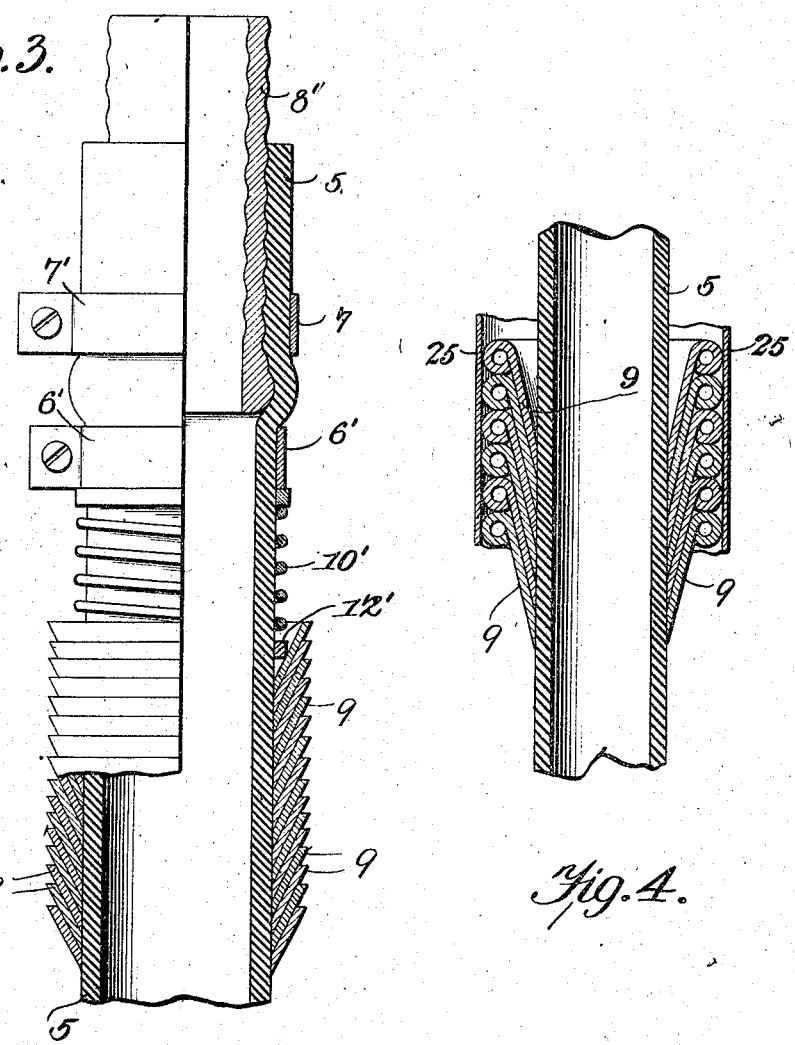
Witnesses:
Welby D. Weir,
Inventor.
Attorneys No. 840,536. PATENTED JAN. 8, 1907.
W. D. WEIR.
FLEXIBLE ARMOR FOR HOSE AND PIPING.
APPLICATION FILED AUG. 21, 1905.
4 SHEETS—SHEET 3.
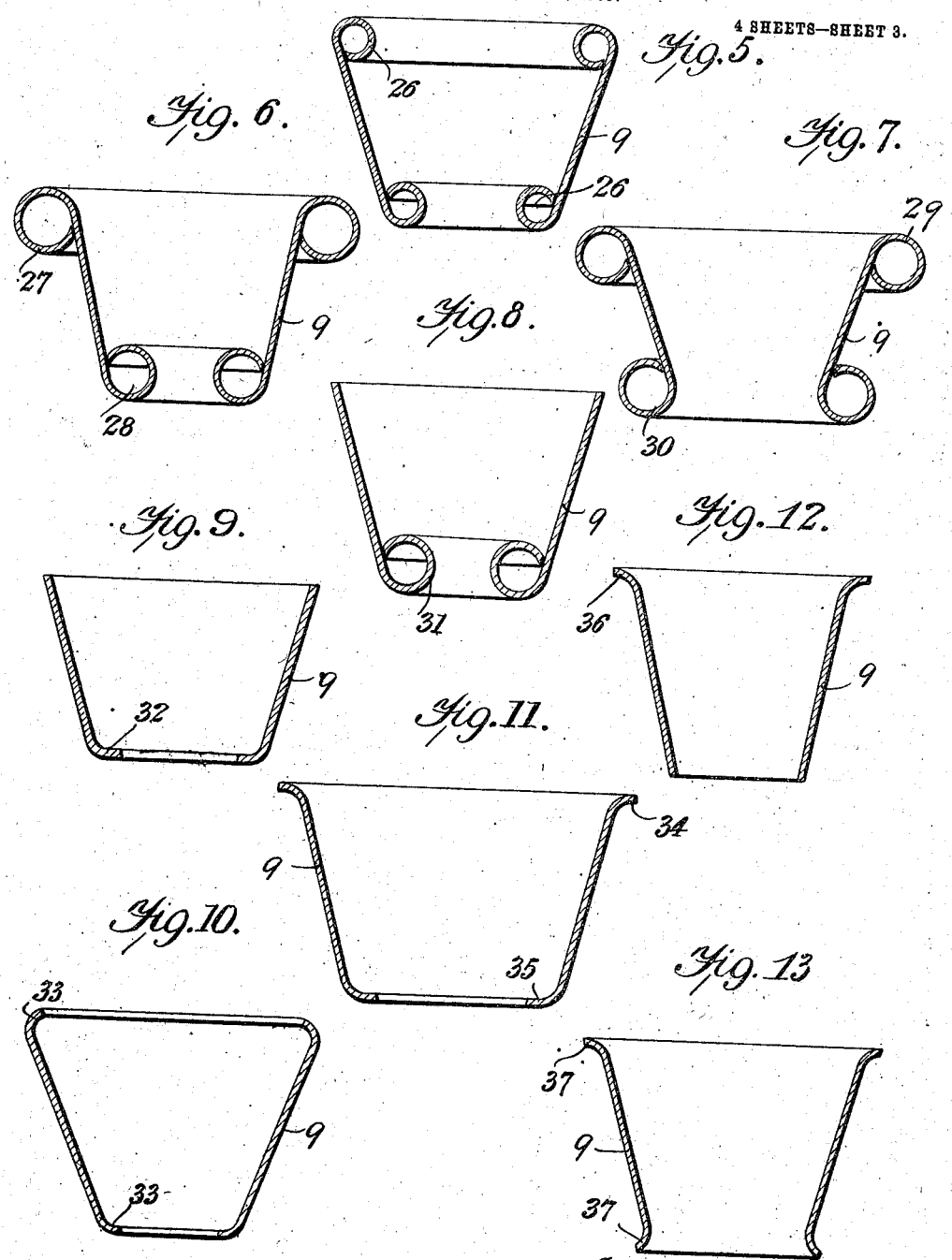

No. 840,536.

PATENTED JAN. 8, 1907.

W. D. WEIR.
FLEXIBLE ARMOR FOR HOSE AND PIPING.
APPLICATION FILED AUG. 21, 1905.

4 SHEETS—SHEET 4.

Witnesses

Wilby D. Weir,
Inventor
by
Attorneys

UNITED STATES PATENT OFFICE.

WELBY DUNBAR WEIR, OF WINNSBORO, TEXAS.

FLEXIBLE ARMOR FOR HOSE AND PIPING.

No. 840,536.     Specification of Letters Patent.     Patented Jan. 8, 1907.

Application filed August 21, 1906. Serial No. 275,157.

*To all whom it may concern:*

Be it known that I, WELBY DUNBAR WEIR, a citizen of the United States, residing at Winnsboro, in the county of Woods and State of Texas, have invented a new and useful Flexible Armor for Hose and Piping, of which the following is a specification.

This invention relates to flexible armor for hose, pipes, tubing, and the like, and has for its object to provide an inexpensive, durable, and efficient armor of this character possessing the requisite degree of flexibility to permit the hose to be easily coiled and used under ordinary conditions.

A further object of the invention is to provide an armor formed of a plurality of overlapping members which surround the hose or pipe and form, in effect, a continuous protecting casing or covering for the same, thereby preventing the hose from kinking and rendering the same capable of withstanding enormous internal and external pressure.

A still further object is to provide means for maintaining the overlapping members in yieldable contact with each other.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

Figure 1:
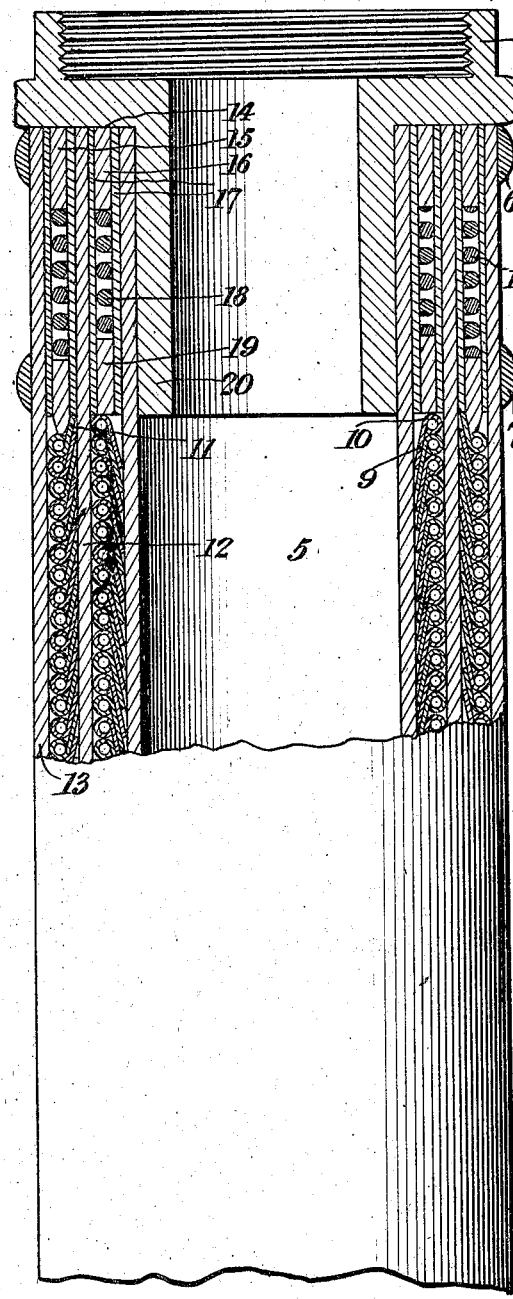
Figure 2:
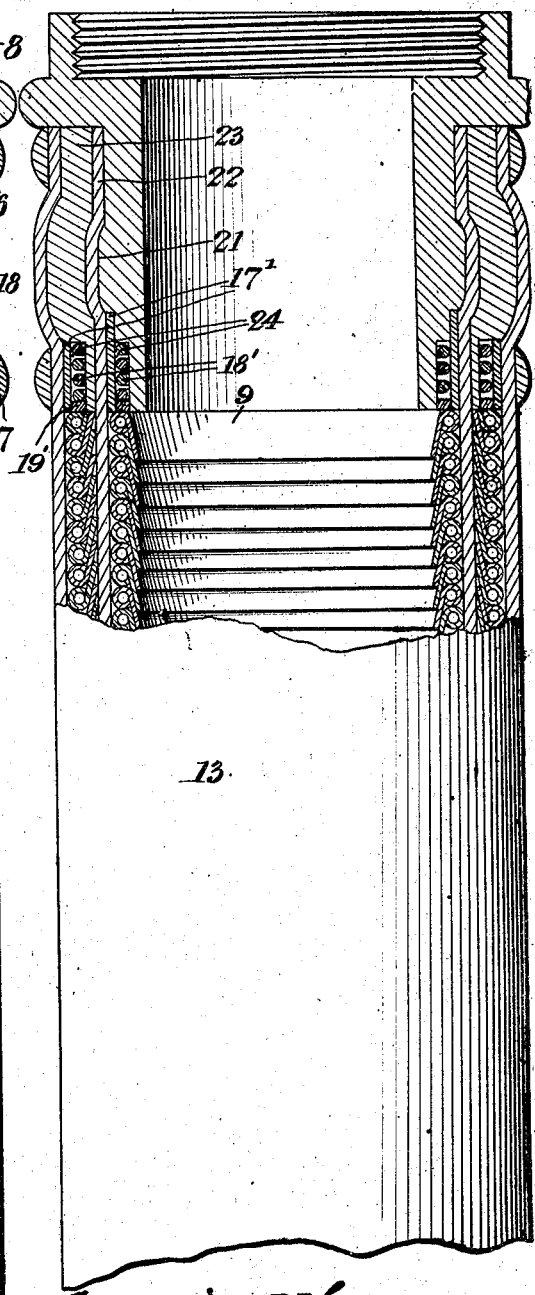

In the accompanying drawings, forming a part of this specification, Figure 1 is a side elevation, partly in section, of a portion of a hose provided with my improved flexible armor. Fig. 2 is a similar view illustrating a modified form of the invention. Fig. 3 is a side elevation, partly in section, of a portion of a hose, showing the protecting rings or armor exposed. Fig. 4 is a longitudinal sectional view illustrating a further modified form of the invention; and Figs. 5 to 19, inclusive, are similar views illustrating further modified forms of the invention.

Similar numerals of reference indicate corresponding parts in all the figures of the drawings.

In the preferred form of the device illustrated in Fig. 1 of the drawings, 5 designates a section of hose of the ordinary form and construction, to one end of which is secured in any suitable manner, as by clamping-bands 6 and 7, a coupling member 8 for attachment to a hydrant or to a similar hose-section.

Surrounding the exterior walls of the hose 5 are a plurality of telescopic rings or members 9, which may be cast, spun, stamped, or otherwise formed from thin sheet metal—such as steel, brass, aluminium, or other suitable material—said rings being preferably in the form of hollow truncated cones, as shown, and having their enlarged ends bent or curved laterally to form annular strengthening ribs or beads 10. The rings 9 are preferably arranged on the hose 5 with the enlarged upper end of one ring overlapping the reduced or contracted lower end of the adjacent ring, thereby forming an inner protecting covering or armor for the hose, which possesses the requisite degree of flexibility to permit the latter to be easily coiled and used under ordinary conditions. Arranged concentric with the inner set of rings 9 is an outer set of rings 11, preferably of the same shape and construction as the rings 9, but disposed in reverse order, as shown, while interposed between the two sets of rings is a flexible separating tube or sheath 12.

Surrounding the outer set of rings 11 is a flexible protecting-casing 13, the end of which bears against a shoulder 14 on the coupling member 8 and is separated from the adjacent end of the tube or sheath 12 by a spacing member or block 15, a similar spacing member 16 serving to separate the tube or sheath from the hose 5.

Arranged on each side of the spacing members or blocks 15 and 16 are metal tubes or sleeves 17, and interposed between said sleeves are coil-springs 18, one end of each of which bears against the adjacent block, while the opposite end thereof engages a sliding collar 19. One of the sliding collars normally bears against the upper ring of the inner set of protecting members, while the adjacent collar bears against the upper ring of the outer set, thereby exerting a constant longitudinal pressure on the succeeding rings of each set and maintaining said rings in constant contact with each other throughout the entire length of the hose. Any number of coil-springs may be employed for exerting a longitudinal pressure on the metal rings, and said springs instead of being positioned at one end of the hose may be placed at an intermediate point on the latter and interposed between any two of the rings of either or both sets of protecting members.

The clamping-bands 6 and 7 preferably engage the outer casing 13, so that when said bands are tightened the casing, hose, and intermediate sheathing will be securely clamped to the reduced extension 20 of the coupling member.

In Fig. 2 of the drawings there is illustrated a modified form of the invention, in which the inner set of overlapping rings 9 forms a metal lining for the hose, this construction of hose being particularly desirable when the latter is designed for conducting water mixed with sand, powdered emery, or other foreign matter which has a tendency to cut and otherwise injure the hose. In this case the reduced extension of the coupling member is provided with an annular shoulder 21 for engagement with the separating-sheath 22, the latter being held in contact with the extension by a spacing-sleeve 23. The spacing-sleeve and extension are formed with annular recesses 24 for the reception of the coil-springs 18' and are also provided with suitable recesses adapted to receive the metal sleeves or tubes 17', the sliding collars 19' being disposed within the recesses 24, as shown.

In Fig. 3 the hose 5 is secured directly to the coupling member 8' by the clamping-bands 6' and 7', while the overlapping rings 9 are disposed on the exterior walls of the hose and held in yieldable contact with each other by a coil-spring 10', interposed between the clamping member 6' and a sliding collar 12'. The members 9 in this form of the device are preferably constructed with smooth exterior walls and are preferably galvanized or otherwise plated or coated, so as to protect the same when exposed to the action of the elements.

In Fig. 4 a single set or series of protecting-rings 9, similar to those shown in Figs. 1 and 2, are employed, the latter being covered and protected by an outer casing or tube 25.

In Fig. 5 the upper and lower edges of the metal ring are curved or bent inwardly, as indicated at 26, while in Fig. 6 the upper edge 27 is curved outwardly and the lower edge 28 bent inwardly, as shown.

In Fig. 7 both the upper and lower edges of the rings are curved laterally against the exterior walls, as indicated at 29 and 30, respectively, and in Fig. 8 the reduced end of the ring is bent inwardly at 31 against the interior walls of said ring.

In Fig. 9 the reduced end of the ring is provided with an inwardly-projecting flange 32, a similar flange 33 being shown at both the upper and the lower edge of the ring (illustrated in Fig. 10) and an outwardly-extending flange 34 at the top and an inwardly-extending flange 35 at the bottom of the ring. (Shown in Fig. 11.)

In Fig. 12 the metal ring is provided with a single laterally-curved flange 36, located at the top of the ring, while in Fig. 13 both the upper and lower edges of the ring are curved laterally, as indicated at 37.

In Figs. 14 to 19, inclusive, the overlapping protecting members forming the flexible armor are arranged to interlock with each other, as shown, said members being slightly different in shape from the members shown in Figs. 1 and 2 of the drawings, but serving to perform the same function—namely, to form a metallic casing or covering for the hose.

Figure 14:
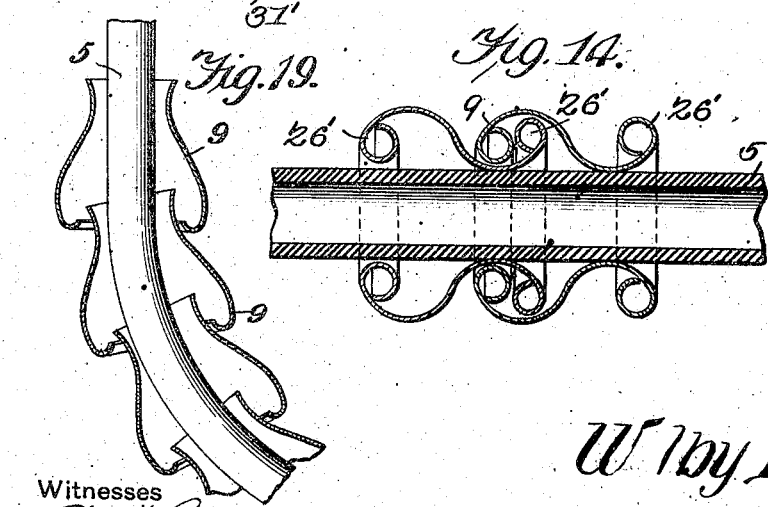

In Fig. 14 the side walls of the protecting members are in the form of a compound or ogee curve, the opposite ends thereof being curved laterally in opposite directions to form annular beads or flanges 26', adapted to engage the corresponding annular beads or flanges of adjacent members.

Figure 15:
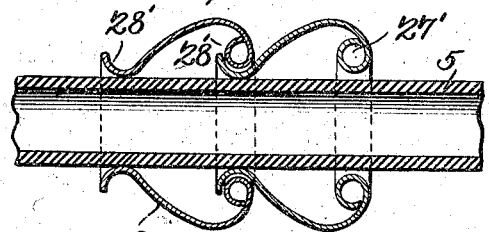

In Fig. 15 the enlarged end of each protecting member is bent to produce an inwardly-extending annular bead 27', which engages an annular groove 28' in the reduced end of the adjacent member.

Figure 17:
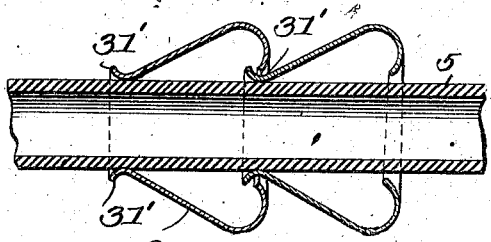
Figure 16:
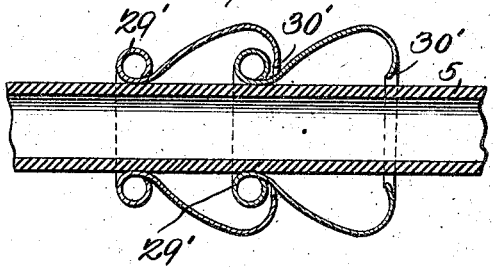
Figure 18:
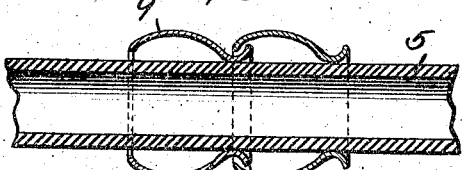

In Fig. 16 the reduced end of each member is provided with an annular bead 29' for engagement with the inwardly-extending lip 30' on the enlarged end of the succeeding member, while in Figs. 17 and 18 the annular beads are dispensed with, the flanged end of one member engaging the end of the adjacent member, as shown at 31'.

Figure 19:
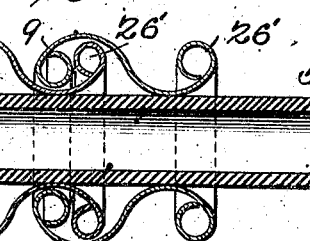

In Fig. 19 I have shown the position assumed by the interlocking protecting members when the hose is bent or coiled, it being understood that all of the interlocking members shown in the drawings will in practice be spaced a sufficient distance from the hose and from each other to permit the requisite freedom of movement of said members in manipulating the hose.

The several forms of the device above described may be used with or without a protecting sheath or covering, and the coil spring or springs for maintaining said members in contact may be employed or dispensed with, as desired.

The flexible armor, while capable of being used whenever required, will be found particularly serviceable in connection with hose for air-brakes, dredges, pneumatic hammers, drills, painting and spraying apparatus, fire-hose, and in all hydraulic and pneumatic appliances.

Having thus described the invention, what is claimed is—

1. A flexible armor for hose formed of a plurality of overlapping members, a pair of spaced collars carried by the hose, and a spring interposed between said collars for yieldably supporting said members in contact with each other.

2. A flexible armor for hose formed of a plurality of overlapping conical members, a collar slidably mounted on the hose and engaging the enlarged end of one of said members, and a coil-spring bearing against said collar for yieldably supporting the overlapping members in contact with each other.

3. A flexible armor for hose formed of an inner and an outer series of overlapping members, provided with lateral reinforcing-flanges, the members of one set being disposed with the flanges extending in the direction of one end of the hose, and the flanges on the opposite set being extended in the direction of the opposite end of the hose; and means for exerting a yieldable pressure on the members of each set in the direction of the length of the hose.

4. A flexible armor for hose formed of an inner and outer series of overlapping members provided with terminal reinforcing-flanges, independent means for yieldably supporting the members of each set in contact with each other, and a flexible sheath separating the two sets of members and interposed between the yieldable means.

5. A flexible armor for hose formed of a plurality of overlapping rings, a second set of rings surrounding the first set and arranged concentric therewith, and independent means for exerting pressure on each set of rings in the direction of the length of the hose.

6. A flexible armor for hose formed of an inner and an outer series of separable overlapping members, the members of one series being disposed on the hose with the enlarged ends thereof extending toward one end of the hose and the members of the adjacent series being arranged with their enlarged ends extending toward the opposite end of said hose, and means for yieldably supporting the members of each series in contact with each other.

7. A flexible armor for hose formed of a plurality of separable overlapping members each provided with a terminal laterally-extending reinforcing-flange, and means engaging the flange of one of the members for yieldably supporting said members in contact with each other.

8. A flexible armor for hose formed of a plurality of separable overlapping conical rings each having its enlarged end bent laterally to form a terminal reinforcing-flange, and means engaging the flange of one of the rings for yieldably supporting said rings in contact with each other.

9. A flexible armor for hose comprising an inner and an outer set of overlapping members, a flexible sheath separating the two sets of members, and independent means for yieldably exerting a longitudinal pressure on each set of members.

10. A flexible armor for hose comprising an inner and an outer set of overlapping members, a flexible sheath separating the two sets of members, bearing-sleeves disposed above said members, and coil-springs interposed between the bearing-sleeves for yieldably supporting the members in contact with each other.

11. A flexible armor for hose comprising an inner and an outer set of overlapping members, a flexible sheath separating the two sets of members, bearing-sleeves disposed above said members, spacing-blocks separating the bearing-plates, collars slidably mounted between said sleeves, coil-springs interposed between the spacing-blocks and sliding collars for yieldably supporting the overlapping members of each set in contact with each other, a covering for the outer set of members, and means for clamping the several parts together.

In testimony that I claim the foregoing as my own I have hereto affixed my signature in the presence of two witnesses.

WELBY DUNBAR WEIR.

Witnesses:
M. D. CARLOCK,
BLANCHE MITCHELL.